US011480919B2

(12) United States Patent
Wengierow et al.

(10) Patent No.: US 11,480,919 B2
(45) Date of Patent: Oct. 25, 2022

(54) HOLOGRAPHIC PROJECTOR

(71) Applicant: Dualitas Ltd, Milton Keynes (GB)

(72) Inventors: Michal Wengierow, Knowlhill (GB); Mikael Collin, Knowlhill (GB); Sahar Chowdhury, Knowlhill (GB)

(73) Assignee: DUALITAS LTD, Milton Keynes (GB)

( * ) Notice: Subject to any disclaimer, the term of this patent is extended or adjusted under 35 U.S.C. 154(b) by 0 days.

(21) Appl. No.: 17/000,952

(22) Filed: Aug. 24, 2020

(65) Prior Publication Data
US 2021/0055691 A1 Feb. 25, 2021

(30) Foreign Application Priority Data
Aug. 23, 2019 (GB) ..................................... 1912158

(51) Int. Cl.
*G03H 1/22* (2006.01)
*G02B 27/01* (2006.01)
(Continued)

(52) U.S. Cl.
CPC ....... *G03H 1/2294* (2013.01); *G02B 27/0172* (2013.01); *G03H 1/2205* (2013.01);
(Continued)

(58) Field of Classification Search
CPC ........... G03H 2001/306; G03H 1/2294; G03H 1/26; G03H 2001/0825; G02B 27/0103;
(Continued)

(56) References Cited

U.S. PATENT DOCUMENTS 8,873,120 B2 * 10/2014 Tsang ...................... G03H 1/26
359/9
2002/0008887 A1 * 1/2002 Horikoshi ............ G03H 1/0808
359/9
(Continued)

FOREIGN PATENT DOCUMENTS

GB 2496108 A 5/2013
GB 2526275 A 11/2015
(Continued)

OTHER PUBLICATIONS

UKIPO Combined Search and Examination Report under Sections 17 & 18(3), GB Application No. 1912158.0, dated Feb. 24, 2020, 5 pages.
(Continued)

*Primary Examiner* — Sultana M Zalalee
(74) *Attorney, Agent, or Firm* — McDonnell Boehnen Hulbert & Berghoff LLP

(57) ABSTRACT

A holographic projector comprises an image processing engine, a hologram engine, a display engine and a light source. The image processing engine is arranged to receive a source image for projection and generate a plurality of secondary images from the source image. The source image comprises pixels. Each secondary image comprises fewer pixels than the source image. A first secondary image has more pixels that a second secondary image. The hologram engine is arranged to determine, such as calculate, a hologram corresponding to each secondary image to form a plurality of holograms. Thus, a first hologram corresponding to the first secondary image has more pixels than a second hologram corresponding to the second secondary image. The display engine is arranged to display each hologram in turn on the display device. The light source is arranged to Illuminate each hologram during display to form a holo-
(Continued)

graphic reconstruction corresponding to each secondary image on a replay plane.

20 Claims, 11 Drawing Sheets

(51) Int. Cl.
| | | |
|---|---|---|
| *G03H 1/26* | (2006.01) | |
| *G06T 19/20* | (2011.01) | |
| *G06T 5/50* | (2006.01) | |
| *G06T 17/20* | (2006.01) | |

(52) U.S. Cl.
CPC ............... *G03H 1/26* (2013.01); *G06T 5/50* (2013.01); *G06T 17/20* (2013.01); *G06T 19/20* (2013.01); *G02B 2027/0174* (2013.01); *G03H 2001/221* (2013.01); *G06T 2200/04* (2013.01)

(58) Field of Classification Search
CPC ........... G06T 5/50; G06T 17/20; G06T 19/20; G06T 2200/04
See application file for complete search history.

(56) References Cited

U.S. PATENT DOCUMENTS

| | | | |
|---|---|---|---|
| 2003/0090752 A1 | 5/2003 | Rosenberger | |
| 2010/0149073 A1* | 6/2010 | Chaum | G02B 27/0172 345/8 |
| 2011/0254916 A1 | 10/2011 | Fan et al. | |
| 2012/0007947 A1* | 1/2012 | Costa | H04N 13/139 348/43 |
| 2012/0281069 A1* | 11/2012 | Nishio | H04N 13/161 348/43 |
| 2013/0106847 A1* | 5/2013 | Sugiyama | G03H 1/2294 345/419 |
| 2013/0265622 A1 | 10/2013 | Christmas et al. | |
| 2014/0022526 A1 | 1/2014 | Van Eijk et al. | |
| 2014/0253987 A1 | 9/2014 | Christmas | |
| 2015/0022526 A1 | 1/2015 | Christmas | |
| 2016/0085211 A1* | 3/2016 | Kim | G03H 1/0808 348/40 |
| 2016/0379606 A1* | 12/2016 | Kollin | G06T 3/4038 345/428 |
| 2017/0082855 A1 | 3/2017 | Christmas et al. | |
| 2017/0115627 A1 | 4/2017 | Christmas et al. | |
| 2017/0220001 A1* | 8/2017 | Watanabe | G02B 26/0808 |
| 2017/0363869 A1 | 12/2017 | Christmas et al. | |
| 2018/0046138 A1 | 2/2018 | Christmas et al. | |
| 2018/0090052 A1* | 3/2018 | Marsh | G09G 3/001 |
| 2018/0120768 A1 | 5/2018 | Christmas | |
| 2018/0188532 A1 | 7/2018 | Christmas et al. | |
| 2018/0210394 A1* | 7/2018 | Favalora | H04N 13/32 |
| 2018/0246325 A1* | 8/2018 | Frisken | G03H 1/2205 |
| 2018/0336666 A1* | 11/2018 | Kim | G06T 7/40 |
| 2019/0004476 A1 | 1/2019 | Mullins | |
| 2019/0041641 A1 | 2/2019 | Christmas et al. | |
| 2019/0064738 A1 | 2/2019 | Cole et al. | |
| 2019/0227492 A1* | 7/2019 | Kroll | G02B 27/0068 |
| 2020/0041957 A1 | 2/2020 | Mullins | |
| 2020/0363772 A1* | 11/2020 | Popov | G03H 1/30 |
| 2021/0084270 A1* | 3/2021 | Christmas | G03H 1/28 |

FOREIGN PATENT DOCUMENTS

| | | |
|---|---|---|
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | 2007-206356 A | 8/2007 |
| JP | 2010-529484 A | 8/2010 |
| JP | 2015-523586 A | 8/2015 |
| KR | 2003-0023973 A | 3/2003 |
| KR | 2011-0042319 A | 4/2011 |
| WO | 2018078366 A1 | 5/2018 |
| WO | 2018100394 A1 | 6/2018 |
| WO | 2018100397 A1 | 6/2018 |

OTHER PUBLICATIONS

Cpending U.S. Appl. No. 17/000,845, filed Aug. 24, 2020.

* cited by examiner

HOLOGRAPHIC PROJECTOR

CROSS-REFERENCE TO RELATED APPLICATIONS

This application claims the benefit of priority of U.K. Patent Application 1912158.1, filed Aug. 23, 2019, which is hereby incorporated herein by reference in its entirety.

FIELD

The present disclosure relates to a projector. More specifically, the present disclosure relates to a holographic projector and a holographic projection system. The present disclosure further relates to a method of holographically projecting a source image and a method of holographically projecting video images. Some embodiments relate to a head-up display and a head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

A holographic projector projects an image onto a replay field on a replay plane. When using the described technology, the projected image is formed from a hologram displayed on pixels of the SLM, herein referred to as "SLM pixels". Thus, the SLM pixels display pixels of the hologram, herein referred to as "hologram pixels". The projected image is formed of "image pixels" which are also referred to herein as "image spots". The image pixels have a finite size and adjacent image pixels in the replay field can interfere or blur together. This is referred to herein as pixel crosstalk. The problem of pixel crosstalk leads to reduced image quality.

Furthermore, a hologram engine takes time to determine a hologram for display from a source image. For example, the hologram may be a Fourier hologram calculated using at least one Fourier transform. The time taken to calculate the hologram can therefore limit the rate at which holograms can be written to the SLM and thus the rate at which a sequence of source images can be projected as a video stream, herein called the "frame rate". Thus, it can be difficult to project images at acceptable video frame rates.

There is disclosed herein an improved holographic projection system and method.

SUMMARY

Aspects of the present disclosure are defined in the appended independent claims.

There is disclosed herein a holographic projector comprising an image processing engine, a hologram engine, a display engine and a light source. The image processing engine is arranged to receive a source image for projection and generate a plurality of secondary images from the source image. The source image comprises pixels. Each secondary image comprises fewer pixels than the source image. A first secondary image has more pixels than a second secondary image. The hologram engine is arranged to determine, such as calculate, a hologram corresponding to each secondary image to form a plurality of holograms. Thus, a first hologram corresponding to the first secondary image has more pixels than a second hologram corresponding to the second secondary image. The display engine is arranged to display each hologram in turn on the display device. The light source is arranged to Illuminate each hologram during display to form a holographic reconstruction corresponding to each secondary image on a replay plane.

The inventors have disclosed herein an approach in which a plurality of a secondary images of different resolution are derived from the same source image. A hologram is determined and displayed for each secondary image. A corresponding plurality of holographic reconstructions are therefore formed one after the other on the replay plane. The holographic reconstructions are formed within the integration time of the human eye such that a viewer cannot tell that the projected image that they see is formed from multiple holographic reconstructions formed one after the other. The projected image therefore appears to be a faithful and complete reconstruction of the source image.

This approach provides three significant technical contributions to the field. Firstly, the quality of the projected image is improved. Secondly, the speed at which the projected image can be updated (i.e., the frame rate) is increased. Thirdly, a more flexible display device is provided. These three technical contributions are explained respectively in the following three paragraphs.

First, the approach disclosed herein enables pixel crosstalk to be managed by displaying different image pixels at different times. More specifically, different groups of image spots are displayed at different times. For example, a first holographic reconstruction formed at a first time (e.g. corresponding to the first secondary image) may comprise a first group of image pixels (e.g., every other image pixel) of an image frame and a second holographic reconstruction at a second time (e.g. corresponding to the second secondary image) may fill in the gaps of the image frame by displaying a second group comprising the remaining image pixels. Since image pixels of the first and second groups (e.g. adjacent pixel groups) are not displayed at the same time, interpixel interference and pixel crosstalk is reduced. The inventors have therefore disclosed a technique of interlacing (in time) a plurality of holographic reconstructions to improve image quality by managing pixel crosstalk.

Secondly, the inventors have disclosed herein an approach which is suitable for real-time (i.e. video rate) processing. Specifically, the holograms can be determined and displayed within the frame time of video. This technical contribution is achieved because each secondary image has fewer pixels than the source image. Although more holograms are required for each source image, each individual hologram can be determined much quicker.

For example, it is quicker to calculate two holograms comprising x pixels using a Fourier transform method than it is to calculate one hologram comprising 2x pixels; it is even quicker to calculate one hologram having x pixels and another hologram having fewer than x pixels. The inventors have therefore disclosed a technique to increase the speed of calculating holograms corresponding to a source image to enable holographic projection at acceptable video frame rates.

Thirdly, the approach disclosed herein provides multiple degrees of design freedom which are highly valuable in a real-world projector. For example, the image processing engine may dynamically change the scheme used to derive the secondary images from the source image, including the size/resolution of different secondary images, based on external factors. Likewise, the display engine may dynamically change the tiling scheme used to display a hologram based on external factors. "Tiling" involves writing a hologram to an SLM that has fewer hologram pixels that the number of pixels of the SLM, and repeating part of the hologram (that is, a continuous subset of the hologram pixels) in the unused pixels of the SLM. The more tiles used to display a hologram, the better the uniformity of the image pixels. The new approach therefore enables each of the holograms to be tiled differently, for example by displaying the holograms using different numbers of tiles. In some real-world applications, it may be better to display some image content of the source image with maximum quality but, optionally, only a low refresh rate is needed and display other image content at lower quality but, optionally, with a higher refresh rate. The inventors have therefore disclosed a technique that can be flexibly adapted to a wide variety of real-world scenarios.

These and other advantages of the new approach disclosed herein will be further appreciated from the following detailed description.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different examples and embodiments may be disclosed separately in the detailed description which follows, any feature of any example or embodiment may be combined with any other feature or combination of features of any example or embodiment. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
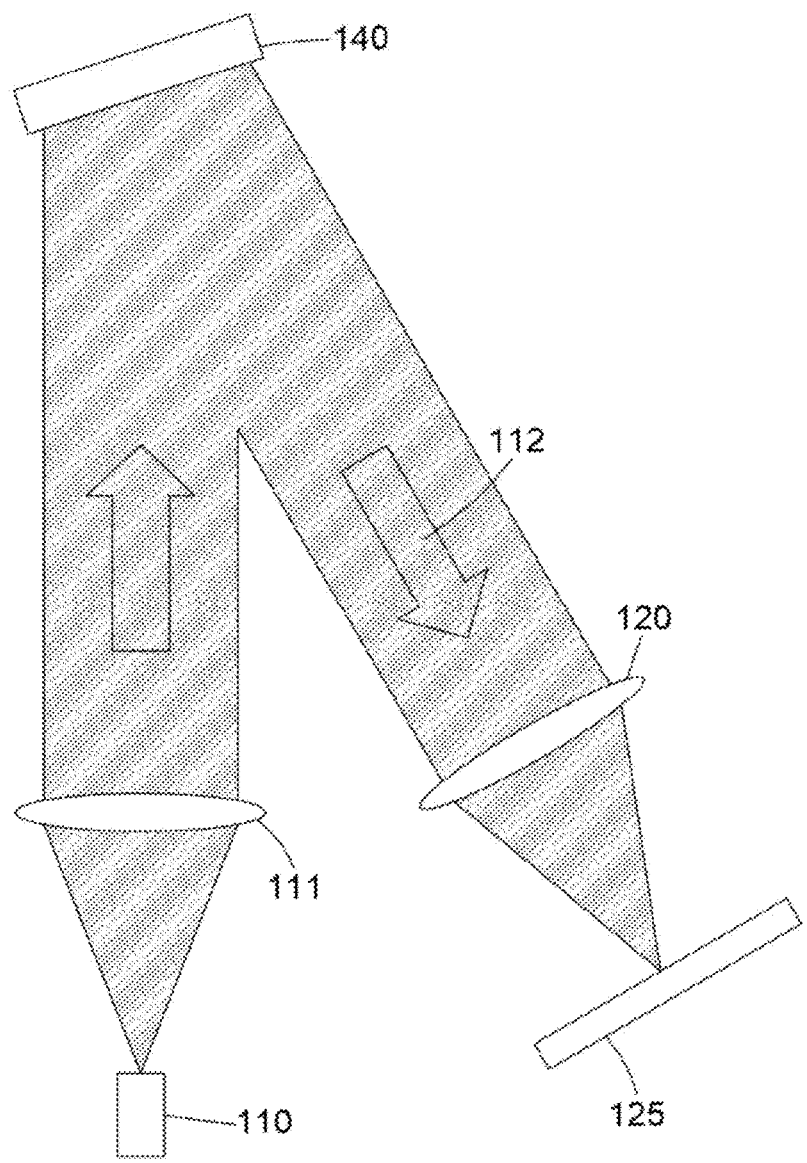
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
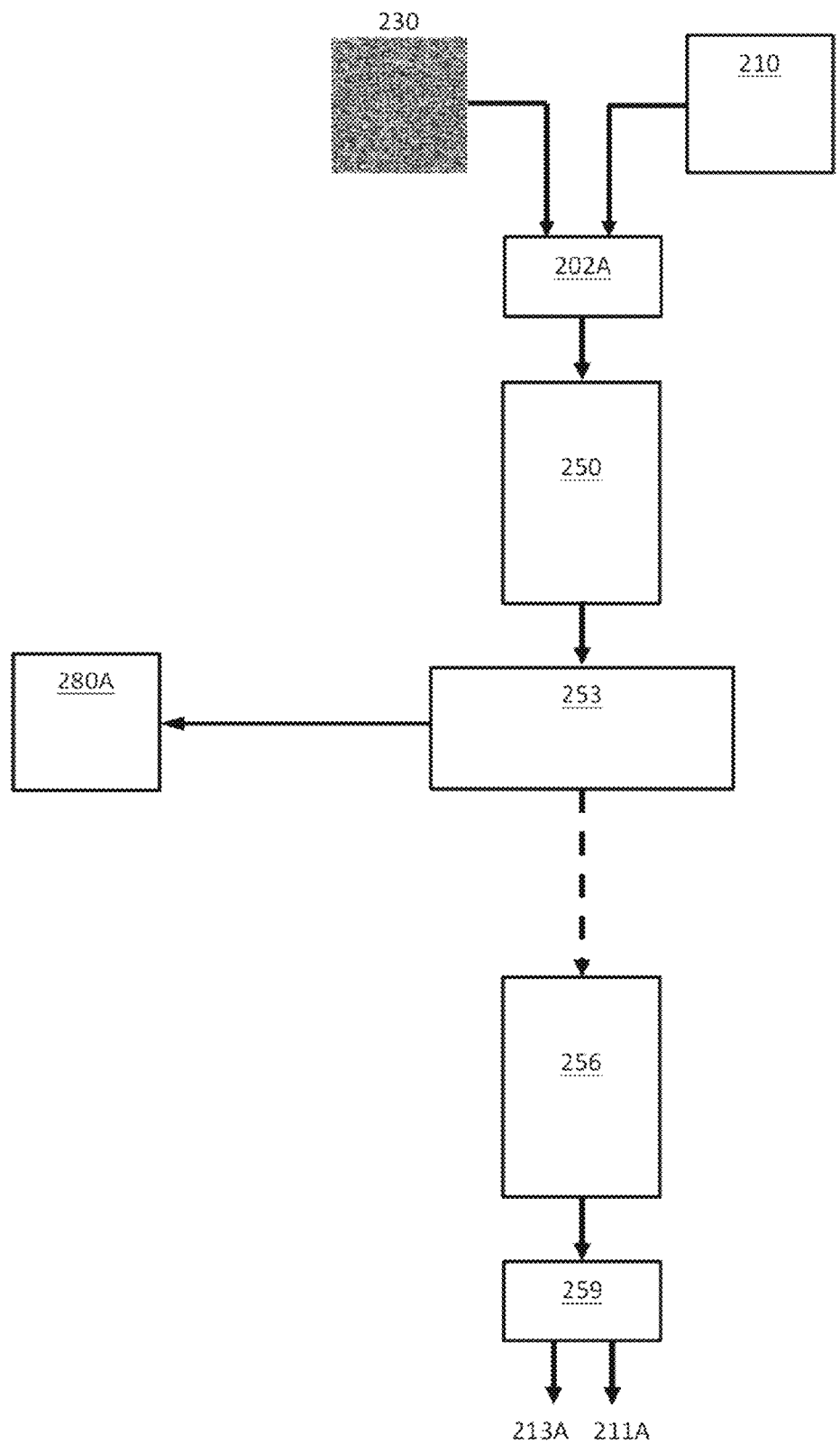
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
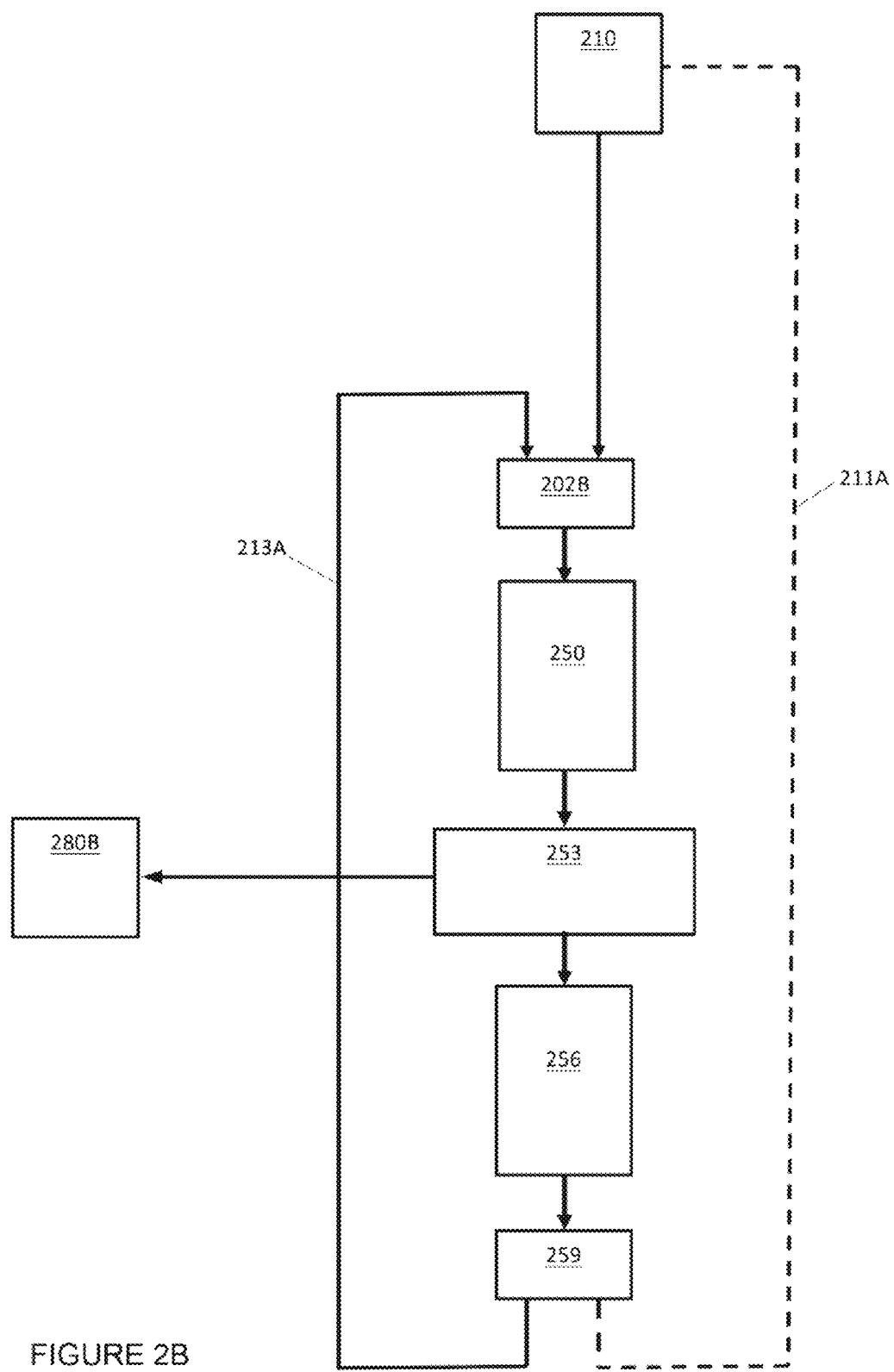
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
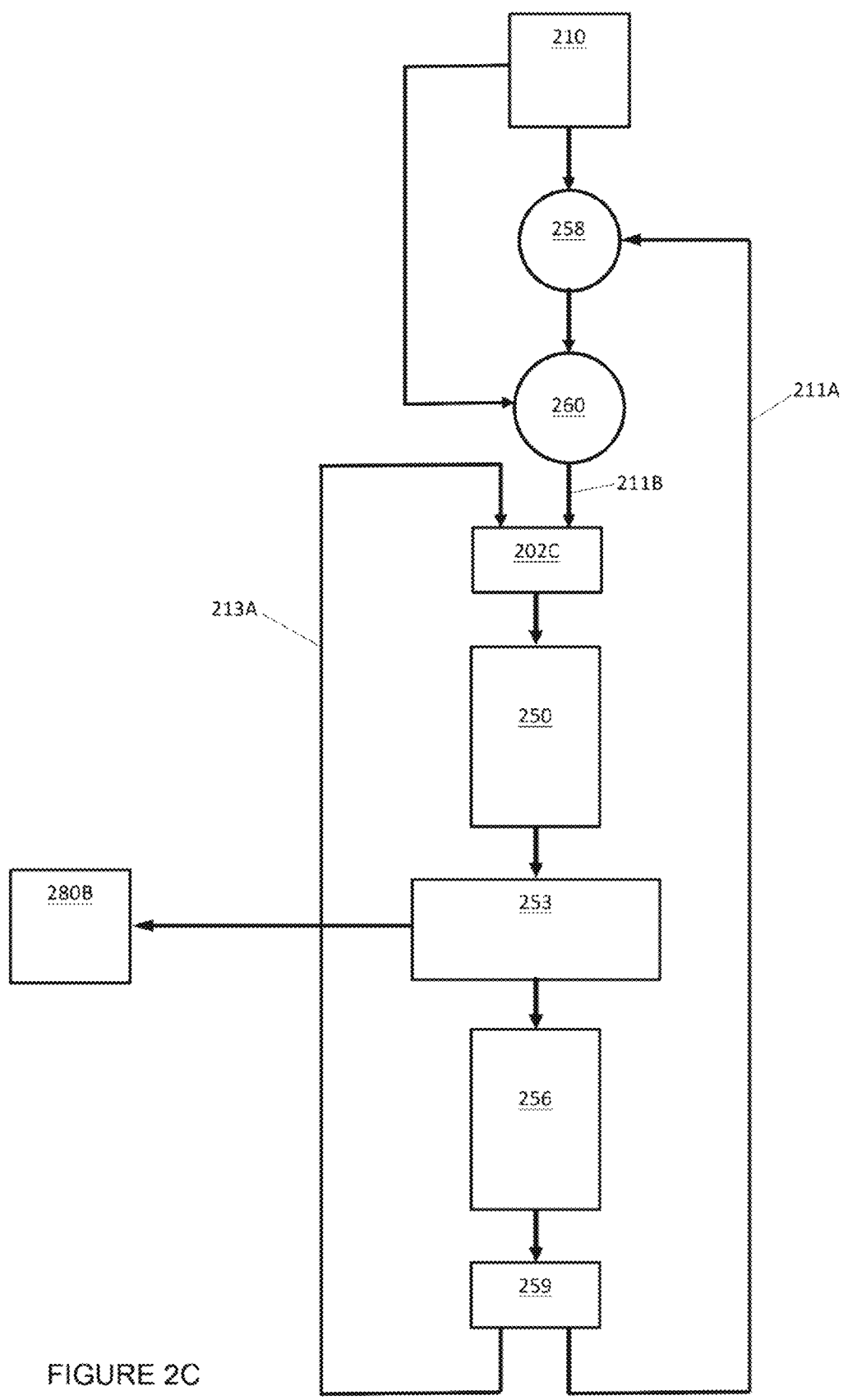
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i \angle R_n[x,y])\}$$

$$\eta = T[x,y] - \alpha(|R_n[x,u]| - T[x,y])$$

where:
F' is the inverse Fourier transform;
F is the forward Fourier transform;
R[x, y] is the complex data set output by the third processing block 256;
T[x, y] is the input or target image;

∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
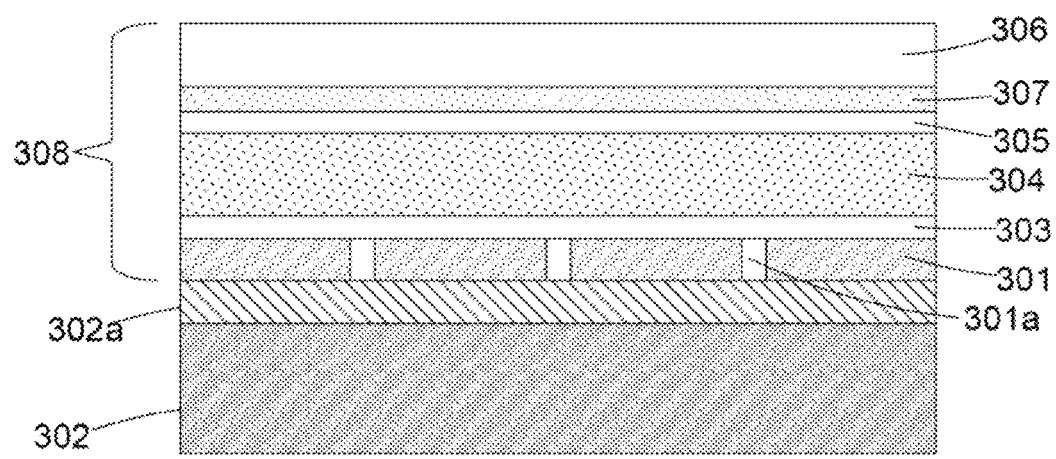
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Generating and Projecting Multiple Holograms Derived from a Source Image

In accordance with conventional techniques, a hologram corresponding to a single image for projection, herein referred to as a "source image", is written to an SLM in a data frame. The size of the hologram determined for the image (i.e. number of hologram pixels) may be less than the size of the spatial light modulator (i.e. number of SLM pixels). Thus, the hologram may occupy only a part of the surface area of the SLM (i.e. only some of the SLM pixels). In this case, a tiling engine may be implemented for writing the hologram to the pixels of the SLM according to a tiling scheme.

In contrast, the inventors propose herein a new approach that determines a plurality of holograms corresponding to a single image for projection (i.e. source/target image). The plurality of holograms may be sent to the display engine of an SLM in a data frame. The SLM displays each of the plurality of holograms in turn, so as to form a corresponding plurality of holographic reconstructions that reproduce the source/target image, as described below.

A target image for projection may be "upscaled" to form a source image having an increased number of pixels. Thus, the resolution (in terms of the number of pixels) is increased. The upscaling of an image may increase the number of pixels by a power of two, since the number of pixels is multiplied in both the x- and y-directions. For example, an image may be upscaled by 4 in the x- and y-directions. For example, each individual pixel may be replicated in a 4×4 array or "block" of pixels (i.e. with the same pixel value) in the upscaled image. In consequence, an image comprising an n×m array of pixels is "upscaled" (or "over-sampled") to obtain a 4n×4m array of pixels forming an oversampled or upscaled version of the image. The oversampled/upscaled image may be used as the source image or the primary image as described below. More complex methods of upscaling the target image may be used.

Figure 4:
FIG. 4 shows an example technique for determining a pair of holograms from respective secondary images derived from a source image for projection by a holographic projector.
Figure 4:
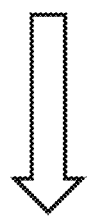
Figure 4:
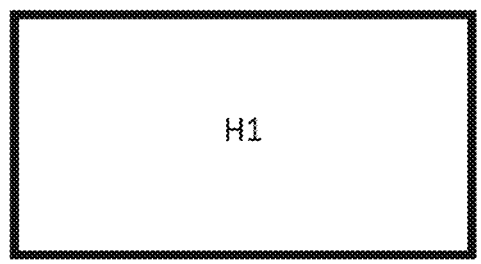
Figure 4:
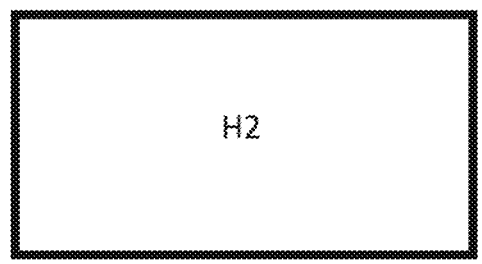
Figure 5:
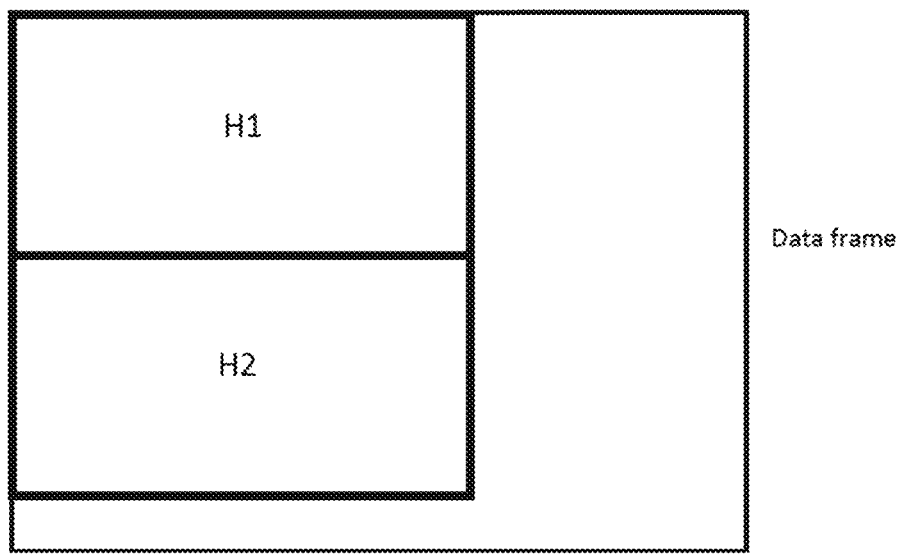
FIG. 5 shows a data frame comprising a pair of holograms for a source image that can be written to an SLM of a holographic projector, and the tiling of each hologram for display, in turn, by the SLM in accordance with embodiments.
Figure 5:
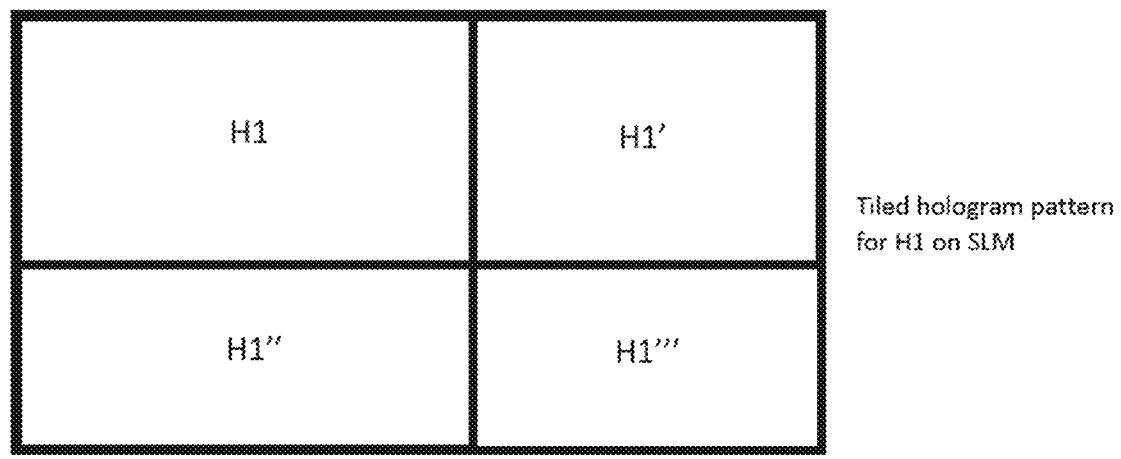
Figure 5:
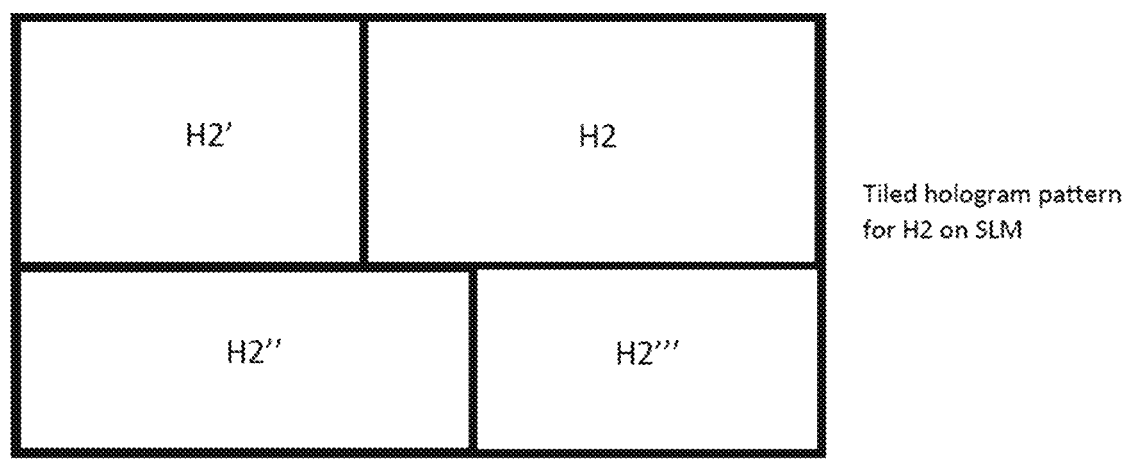

FIGS. 4 and 5 illustrate one example of the proposed approach, which generates a pair of holograms H1 and H2 from a single source image.

Referring to FIG. 4, an example source image (shown at the top of the drawing) comprising an 4×8 array of image pixels is processed (e.g. by an image processing engine) to generate a pair of secondary images 1 and 2 (shown in the middle of the drawing). Secondary image 1 is generated using every other image pixel of the source image in a first checkerboard pattern, and filling the remaining pixels with a "zero". Thus, secondary image 1 includes the image pixels from the source image at locations (1, 1), (1, 3) . . . (2, 2), (2, 4) . . . (3, 1), (3, 3) . . . and (4, 2) . . . (4, 8). Secondary image 2 is generated using the opposite or inverse image pixels of the source image to secondary image 1. Thus, secondary image 2 is generated using every other image pixel of the source image in a second checkerboard pattern that is opposite to (i.e. the inverse of) the first checkerboard pattern, and filling the remaining pixels with a "zero". Thus, secondary image 2 includes the image pixels from the source image at locations (1, 2), (1, 4) . . . (2, 1), (2, 3) . . . (3, 2), (3, 4) . . . and (4, 1) . . . (4, 7).

Each of secondary images 1 and 2 is then processed (e.g. by a hologram engine) to determine a corresponding hologram H1, H2 (shown at the bottom of the drawing). Any suitable method may be used to calculate the hologram, such as the algorithms described above.

Referring to FIG. 5, a data frame is generated (shown at the top of the drawing). For example, the data frame generated may be an HDMI video frame. The data frame comprises the pair of holograms H1, H2 calculated from secondary images 1 and 2 derived from the source image as shown in FIG. 4. Each hologram may be processed as an individual data stream but contained within the data frame in any particular configuration. The data frame includes a "Tile pointer" indicating the starting point of the hologram data of each hologram within the data frame. The data frame also includes unused bits of the data frame. Holograms of the data frame are streamed to the SLM of a holographic projector in turn. Each hologram is displayed in turn on the SLM using a tiling scheme. For example, first hologram H1 is written to the SLM using a first tiling scheme (shown in the middle of the drawing). In particular, hologram H1 is displayed on the SLM at a first point in time with the first tiling scheme comprising full tile H1 and part tiles H1', H1" and H1'". Second hologram H2 is written to the SLM using a second tiling scheme (shown at the bottom of the drawing). In particular, hologram H2 is displayed on the SLM at a second point in time, after the first point in time, with the second tiling scheme comprising full tile H2 and part tiles H2', H2", and H2'". In the illustrated example, first and second tiling schemes are different, although it is possible to use the same tiling scheme. Thus, holograms H1 and H2 are displayed sequentially (i.e. one after the other) rather than concurrently (i.e. at the same time). The display of each individual hologram H1, H2 may be considered as displaying a "sub-frame", since only part of the source image is reconstructed, whereas the display of both holograms H1 and H2 in turn, may be considered as a frame. In embodiments, each of the holograms H1 and H2 may be sequentially written to, and thus displayed on, the SLM at a speed that is sufficiently fast that the corresponding holographic reconstructions are formed within the integration time of the human eye. Thus, a viewer, observing the replay field on which the holographic reconstructions are formed, sees a single projected image rather than a dynamically changing projected image corresponding to multiple holographic reconstructions formed one after the other. The projected image therefore appears to be a faithful and complete reconstruction of the source image.

As the skilled person will appreciate, whilst FIG. 4 shows generating two secondary images from the source image, it is possible to generate three or more secondary images and calculate corresponding holograms. Similarly, whilst FIG. 5 shows just two holograms included within a data frame, which are sequentially displayed on the SLM using a corresponding tiling scheme, it is possible to include three or more holograms in the data frame, and sequentially display each of the holograms on the SLM using the same or a different tiling scheme for each hologram. An example using three holograms is described below.

Figure 6:
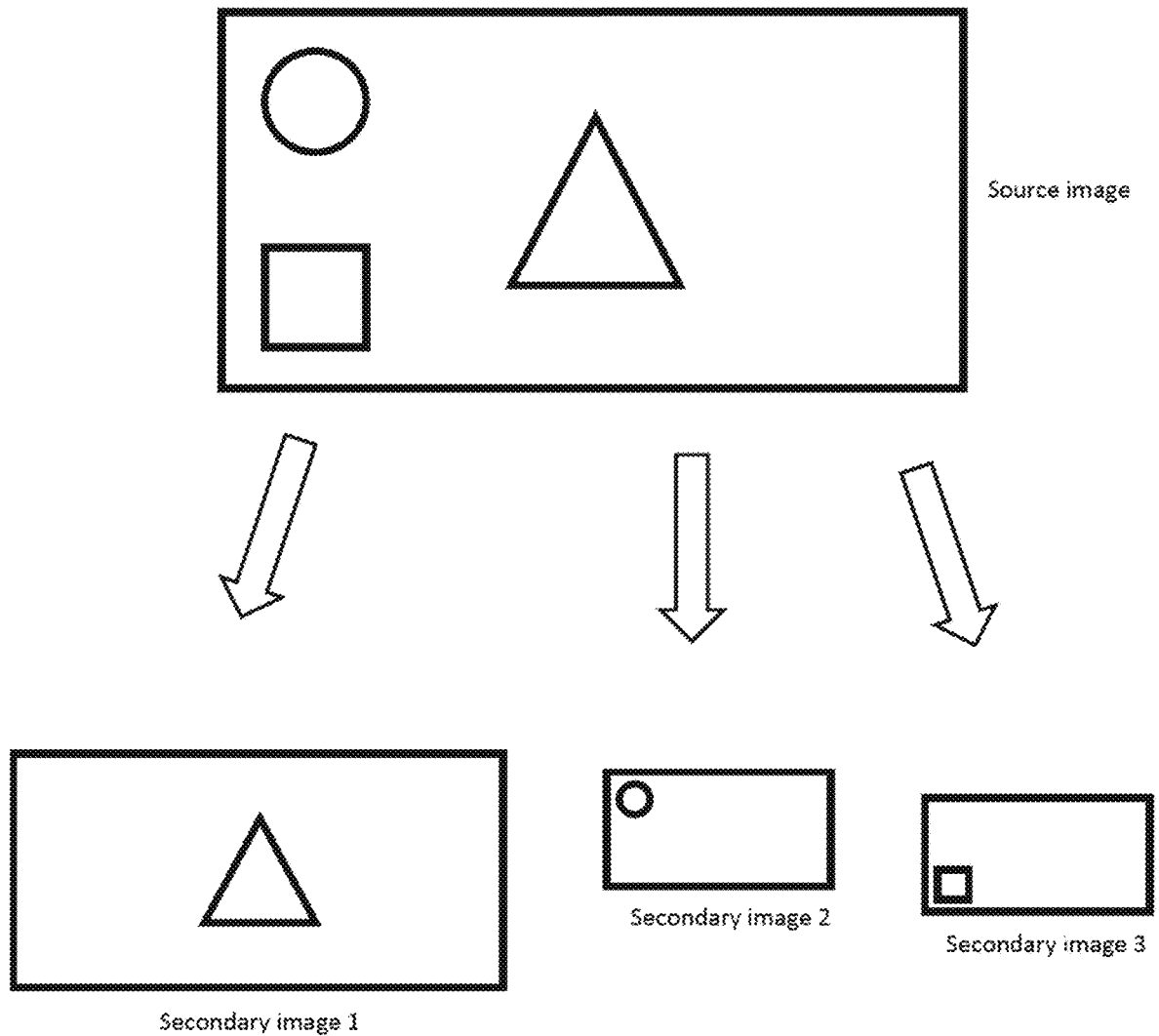
FIG. 6 shows an example technique for deriving a plurality of secondary images from a source image for projection by a holographic projector in accordance with embodiments.
Figure 7:
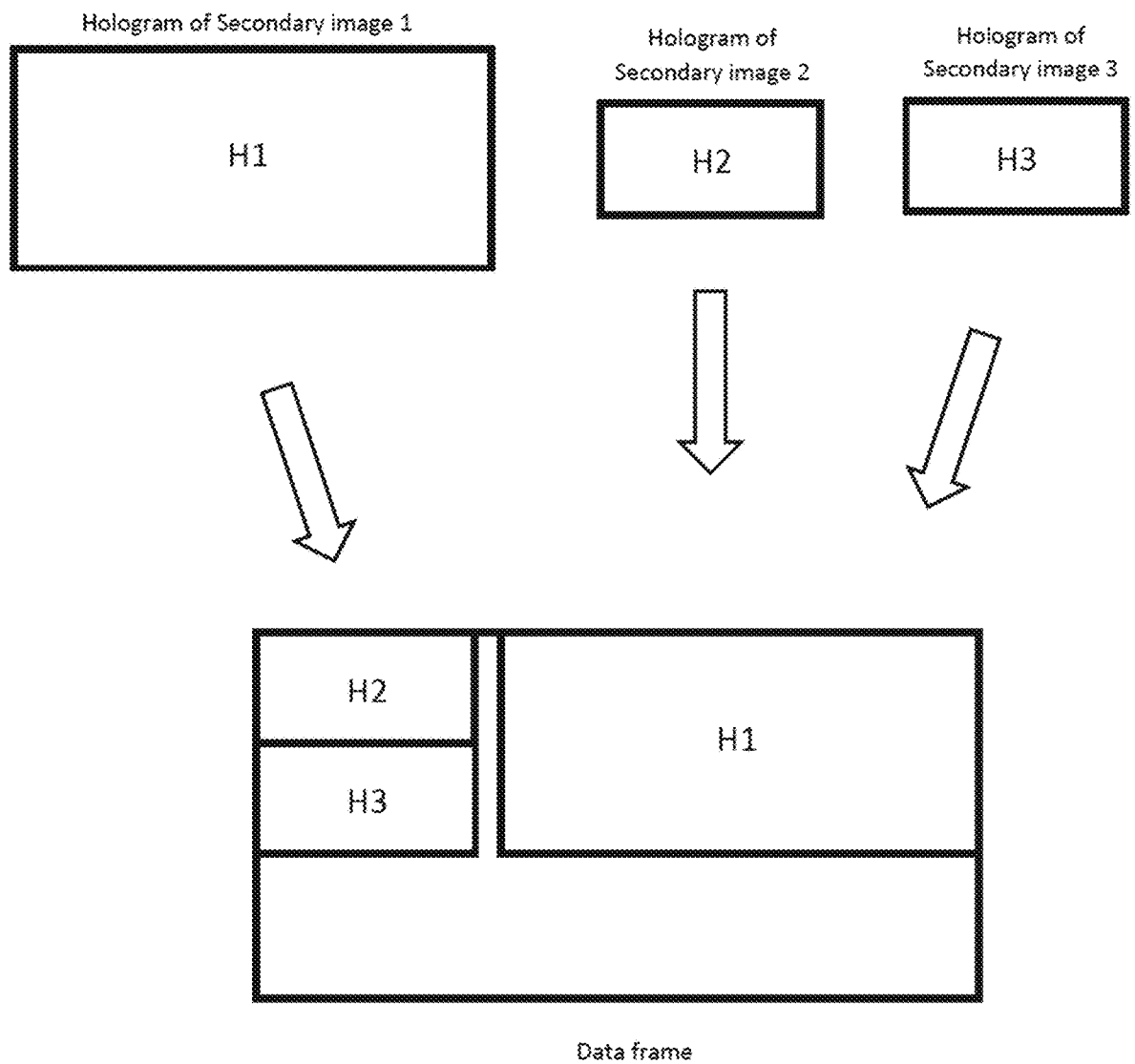
FIG. 7 shows another example technique for determining holograms from each of the secondary images of FIG. 6, and an example data frame comprising the determined holograms in accordance with embodiments.

FIGS. 6 and 7 illustrate an example of the proposed approach, which generates three holograms H1, H2 and H3 from a single source image, in accordance with an embodiment.

Referring to FIG. 6, an example source image (shown at the top of the drawing) comprising an array of image pixels is processed (e.g. by an image processing engine) to generate three secondary images 1, 2 and 3 (shown in the middle of the drawing). In particular, source image comprises three objects, a triangle at a location in the centre of the image, a circle at the top left corner of the image and the square at the bottom left corner of the image. In the illustrated source image, the triangle is larger than the circle and square. Thus, the triangle occupies more pixels of the source image than the circle and square. Image processing software may be used to process the source image. In particular, object recognition software may be used to identify the three objects in the source image, and three secondary images may be generated from the source image corresponding to the identified objects. In the illustrated example, secondary images comprising objects located in a peripheral region of an image are generated with a smaller size (i.e. fewer pixels) than secondary images comprising objects located in a central region of an image. Thus, secondary image 1 corresponding to the triangle is larger than secondary images 2 and 3 corresponding to the circle and square, respectively. The smaller secondary images 2 and 3 may be obtained, for example, by under sampling the image data for the object in the source image, to thereby reduce the number of pixels in the secondary image. Thus, each secondary image may be generated from the source image using a unique sampling scheme. Accordingly, the three secondary images 1, 2 and 3 derived from the same source image have different resolutions (i.e. different numbers of pixels). In particular, secondary image 1 derived from the central region of the source image, has a greater number of pixels, and thus a higher resolution, than secondary images 2 and 3 derived from peripheral regions of the source image.

In the example illustrated in FIG. 6, the size/resolution of a particular secondary image (i.e. number of pixels) is determined based on the location, within the source image, of the object (or part of the source image) to be included in that secondary image. This is not essential. Other techniques for determining the size/resolution of secondary images according to other factors are possible. For example, it may be desirable to produce larger secondary images for certain types of features, objects or parts of the source image to achieve a higher resolution. In another example, it may be desirable to produce larger secondary images for objects that are moving more quickly or more slowly, to achieve a higher resolution.

Referring to FIG. 7, each of the secondary images 1, 2 and 3 of different size/resolution determined in FIG. 6, is processed (e.g. by a hologram engine) to determine a corresponding hologram, H1, H2 and H3 (shown at the top of the drawing). The number of hologram pixels of each of the holograms H1, H2 and H3 depends on the number of image pixels of each of the secondary images 1, 2 and 3, respectively. In particular, as shown in FIG. 7, the size/resolution of a hologram (i.e. number of hologram pixels) increases with the size/resolution of the corresponding secondary image (i.e. number of image pixels). Any suitable method may be used to calculate the hologram, such as the algorithms described above. In some example methods, the number of hologram pixels of a calculated hologram is the same as the number of image pixels of the corresponding secondary image. Notably, the time taken to calculate holograms H2 and H3 from corresponding second and third secondary images 2 and 3, is less than the time taken to calculate hologram H1 from corresponding first secondary image 1. This is due to the fact that secondary images 2 and 3 comprise fewer pixels than larger secondary image 1.

As shown in FIG. 7, a data frame is generated (shown at the bottom of the drawing). For example, the data frame may be an HDMI video frame. The data frame comprises the three holograms H1, H2 and H3 calculated from secondary images 1, 2 and 3 derived from the source image as shown in FIG. 6. Each hologram may be processed as an individual data stream, and contained within the data frame in accordance with any particular configuration. The data frame includes a "Tile pointer" indicating the starting point of the hologram data for each hologram within the data frame. The data frame also includes unused bits of the data frame. Holograms of the data frame are streamed to the SLM of a holographic projector in turn. Each hologram is sequentially displayed on the SLM using a tiling scheme. For example, first hologram H1 may be written to the SLM using a first tiling scheme, and displayed on the SLM at a first point in time with the first tiling scheme. Second hologram H2 may be written to the SLM using a second tiling scheme, and displayed on the SLM at a second point in time, after the first point in time, with the second tiling scheme. Third hologram H3 may be written to the SLM using a third tiling scheme, and displayed on the SLM at a third point in time, after the second point in time, with the third tiling scheme. One or more of the first, second and third tiling schemes may be different from the other tiling scheme. Thus, holograms H1, H2 and H3 are displayed sequentially (i.e. at different times). The display of each individual hologram may be considered as a "sub-frame". In embodiments, each of the holograms H1, H2 and H3 may be sequentially written to, and thus displayed on, the SLM at a speed that is sufficiently fast that the corresponding holographic reconstructions are formed within the integration time of the human eye. Thus, as described above, the projected image appears to be a faithful and complete reconstruction of the source image to a viewer of the replay field. In some embodiments, the holographic reconstructions formed by displaying successive holograms of the SLM may be translated with respect to each other in order to faithfully reconstruct the source image on the replay plane. For example, in scenarios in which alternate image pixels or groups of image pixels (e.g. every other image pixel) are formed by hologram H2 and the other alternate image pixels or groups of image pixels (e.g. every other remaining image pixel) are formed by hologram H3, in particular where holograms H2 and H3 have the same size, it may be necessary to translate the relative positions of the respective replay fields on the replay plane (e.g. using x and x phase-ramps), sometimes referred to as "beam steering". This enables the image spots formed by hologram H3 to be offset relative to the image spots formed by hologram H2 (which might otherwise overlap due to the same size of holograms H2 and H3) so as to fill in the gaps between the image spots formed by hologram H2. In this way, the image spots formed by both holograms H2 and H3 together faithfully reconstruct the source image on the replay plane. The same may be true in scenarios in which adjacent image pixels or groups of image pixels are formed by holograms H1 and H2 (and/or H3) having different sizes.

Accordingly, there is disclosed herein a method of holographic projection. The method receives a source image for projection, wherein the source image comprising pixels. The method generates a plurality of secondary images from the source image, wherein each secondary image comprises fewer pixels than the source image and wherein a first secondary image has more pixels than a second secondary image. The method further calculates a hologram corresponding to each secondary image to form a plurality of holograms, such that a first hologram corresponding to the first secondary image has more pixels than a second hologram corresponding to the second secondary image. The method displays each hologram in turn on a display device such as an SLM. The method Illuminates each hologram during display to form a holographic reconstruction corresponding to each secondary image on a replay plane.

Since the holographic reconstruction of a smaller hologram has fewer image spots in the same replay field size, the density of image spots, and thus the image resolution, is lower than for a larger hologram. Moreover, the signal-to-noise ratio (SNR) may be higher if more tiles of the smaller hologram are displayed in accordance with the chosen tiling scheme to improve pixel uniformity.

In consequence of these and other differences between smaller and larger holograms, it may be appropriate to use a different refresh rate for smaller holograms compared to larger holograms. For example, a part of the source image for which a smaller hologram (with lower resolution and potentially higher SNR depending on the chosen tiling scheme) is generated, could be refreshed at a higher speed or sub-frame rate than a part of the source image for which a larger hologram (with higher resolution and lower SNR) is generated. For instance, in a head-up display (HUD) application, for example for use in a moving vehicle, it may be desirable to display objects in the "near field" (appearing closer to the viewer) at a relatively low resolution but a relatively high refresh rate, whilst displaying objects in the "far field" (appearing further away to the viewer) at a relatively high resolution but at a relatively low refresh rate, or vice versa. As the skilled person will appreciate, other variations are possible in accordance with the present disclosure.

In some embodiments, there is provided a display device such as a head-up display comprising the holographic projector and an optical relay system. The optical relay system is arranged to form a virtual image of each holographic reconstruction. In some embodiments, the source image comprises near-field image content in a first region of the source image and far-field image content in a second region of the source image. A virtual image of the holographically reconstructed near-field content is formed a first virtual image distance from a viewing plane, e.g. eye-box, and a virtual image of the holographically reconstructed far-field content is formed a second virtual image distance from the viewing plane, wherein the second virtual image distance is greater than the first virtual image distance. In some embodiments, one hologram of the plurality of holograms corresponds to image content of the source image that will be displayed to a user in the near-field (e.g. speed information) and another hologram of the plurality of holograms corresponds to image content of the source image that will be projected into the far-field (e.g. landmark indicators or navigation indicators). The hologram corresponding to the near-field content may have more pixels that the hologram corresponding to the far-field content, or vice versa. The image content for the far-field may be refreshed more frequently than the image content for the near-field, or vice versa.

In an embodiment, the holographic projector receives a stream of source images and refreshes the first hologram at a different rate to the second hologram. The first hologram has more pixels, and thus higher resolution, than the second hologram. Thus, in embodiments, the first hologram is refreshed at a slower refresh rate (i.e. frame rate) than the second hologram. In this way, a first hologram determined from a first source image is refreshed, based on subsequently received source images, less frequently that the second source image. Thus, the refresh rate can be increased due to the reduced time necessary to calculate the second hologram, which has fewer pixels, without the need to calculate the first hologram every time.

Figure 8A:
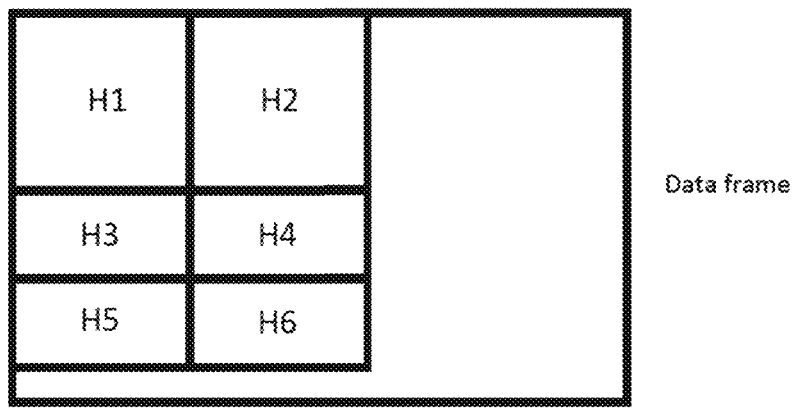
FIGS. 8A and 8B show further example data frames comprising a plurality of holograms in accordance with embodiments.
Figure 8B:
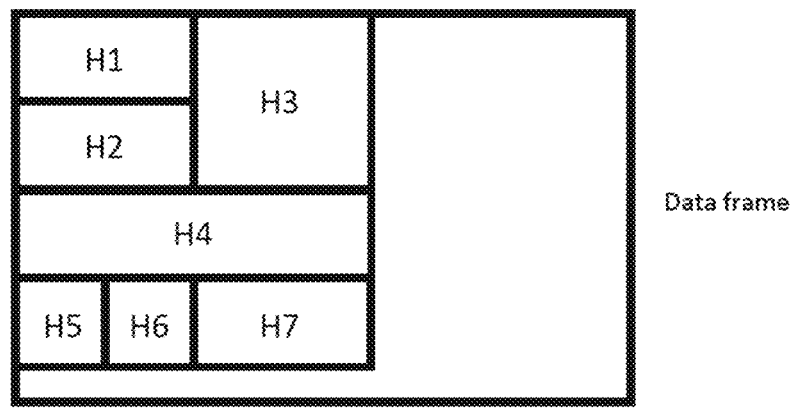

The approach disclosed herein provides multiple degrees of freedom, and thus a more flexible holographic projector. For example, the technique defining how the secondary images are derived from the source image may be dynamically varied. In particular, the one or more of: the number of secondary images generated from a source image, the size/resolution of each secondary image/corresponding hologram, the sampling scheme used for generating each secondary image and the factors used for their determination may be dynamically varied. For instance, the image processing engine may dynamically change the scheme used to derive the secondary images from the source image, based on application requirements and/or external factors indicated by a control signal. FIGS. 8A and 8B illustrate further example data frames for a source image with different numbers of holograms and resolutions. In addition, many different tiling schemes may be used. A display engine (or tiling engine thereof) may dynamically change the tiling scheme used to display a hologram according to application requirements and/or external factors indicated by a control signal. This flexibility is highly valuable in a real-world projector, which may display different source images in a dynamically varying environment. For example, a holographic projector may be situated in a moving vehicle.

Figure 9:
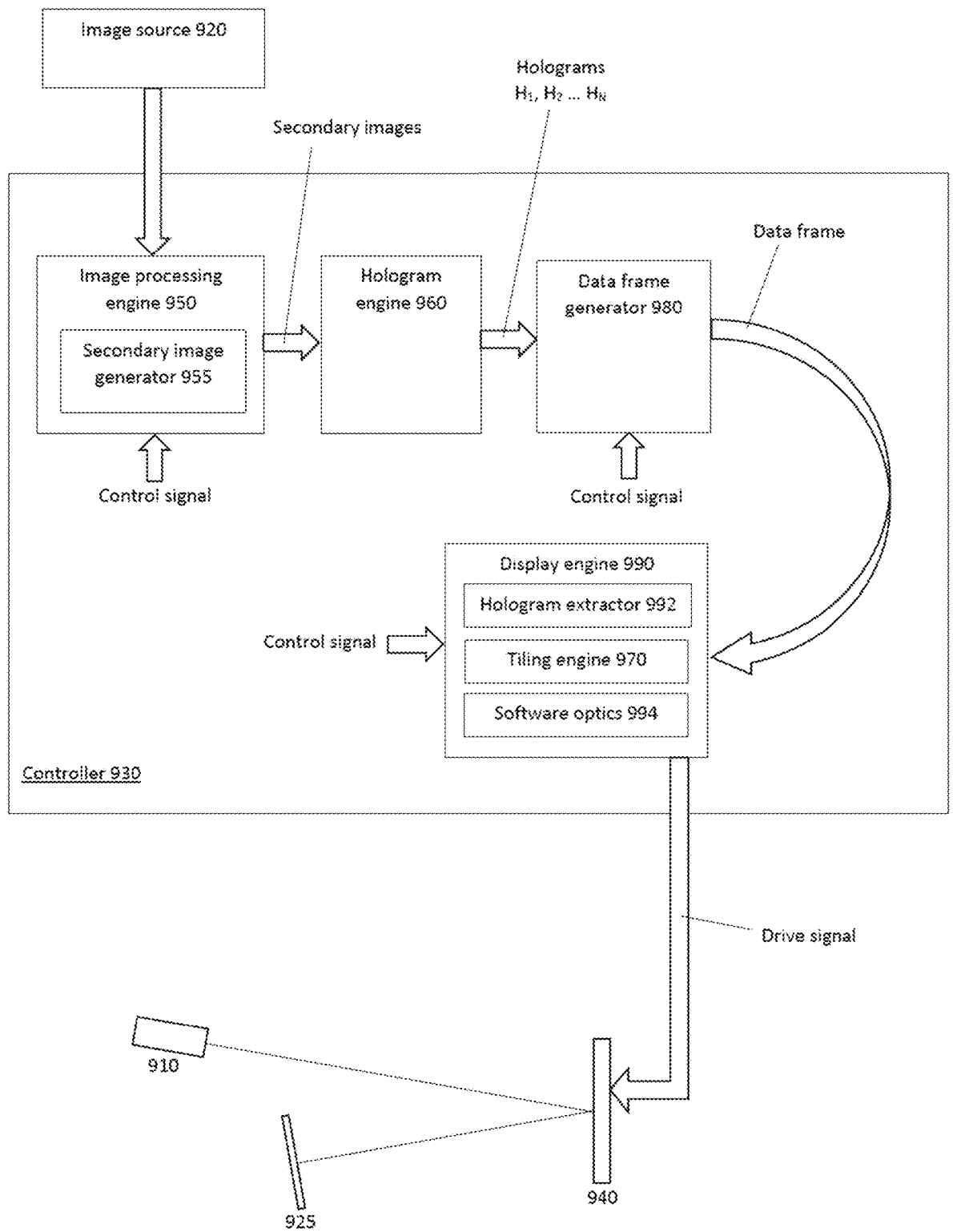
FIG. 9 is a schematic showing a holographic projector in accordance with embodiments.

FIG. 9 is a schematic showing a holographic projector 900 in accordance with embodiments. Holographic projector 900 comprises a spatial light modulator (SLM) 940 arranged to display holograms received from a controller 930. In operation, a light source 910 illuminates the hologram displayed on SLM 940 and a holographic reconstruction is formed in a replay field on a replay plane 925. Controller 930 receives one or more images from an image source 920. For example, image source 920 may be an image capture device such as a still camera arranged to capture a single still image or video camera arranged to capture a video sequence of moving images.

Controller 930 comprises image processing engine 950, hologram engine 960, data frame generator 980 and display engine 990. Image processing engine 950 receives a source image from image source 920. The source image may be upscaled version of the target image, or the image processing engine may perform upscaling as described herein. Image processing engine 950 includes a secondary image generator 955 arranged to generate a plurality of secondary images from the source image in accordance with a defined scheme, as described herein. Image processing engine 950 may receive a control signal or otherwise determine the scheme for generating the secondary images. Thus, each secondary image comprises fewer pixels than the source image. Image processing engine 950 passes the plurality of secondary images to hologram engine 960. Hologram engine 960 is arranged to determine a hologram corresponding to each secondary image, as described herein. Hologram engine 960 passes the plurality of holograms to data frame generator 980. Data frame generator 980 is arranged to generate a data frame (e.g. HDMI frame) comprising the plurality of holograms, as described herein. In particular, data frame generator 980 generates a data frame comprising hologram data for each of the plurality of holograms and pointers indicating the start of each hologram. Display engine 990 is arranged to display each of the plurality of holograms, in turn, on SLM 940. Display engine 990 comprises hologram extractor 992, tiling engine 970 and software optics 994. Display engine 990 extracts each hologram from the data frame using hologram extractor 992 and tiles the hologram according to a tiling scheme generated by tiling engine 970, as described herein. In particular, tiling engine 970 may receive a control signal to determine the tiling scheme, or may otherwise determine a tiling scheme for tiling based on the hologram. Display engine 990 may optionally add a phase ramp function (also called a software grating function) and/or a software lens using software optics 994, to translate the position of the replay field on the replay plane and/or determine the position of the replay plane, as described herein. Accordingly, for each hologram, display engine 990 is arranged to output a drive signal to SLM 940 to display each hologram of the plurality of holograms, in turn, according to a corresponding tiling scheme, as described herein.

Controller 930 may dynamically control how secondary image generator 955 generates secondary images, as described herein. Controller 930 may dynamically control the refresh rate for holograms. As described herein, the refresh rate may be considered as the frequency at which a hologram is recalculated by hologram engine, from a next source image in a sequence received by image processing engine 950 from image source 920. As described herein, dynamically controllable features and parameters may be determined based on external factors indicated by a control signal. Controller 930 may receive control signals relating to such external factors, or may include modules for determining such external factors and generating such control signals, accordingly.

As the skilled person will appreciate, the above-described features of controller 930 may be implemented in software, firmware or hardware, and any combination thereof.

ADDITIONAL FEATURES

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed on the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth or primary diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
   an image processing engine arranged to:
     receive a source image for projection, wherein the source image comprises pixels; and
     generate first and second secondary images from the source image, wherein each secondary image comprises fewer pixels than the source image and wherein the first secondary image has more pixels than the second secondary image;
   a hologram engine arranged to determine first and second holograms corresponding to the first and second secondary images respectively, such that the first hologram has more pixels than the second hologram;
   a display engine arranged to display each hologram in turn on a display device; and
   a light source arranged to Illuminate each hologram during display to form a holographic reconstruction corresponding to each secondary image on a replay plane.

2. A holographic projector as claimed in claim 1 wherein the image processing engine is arranged to derive the first secondary image from a central region of the source image and the second secondary image from a peripheral region of the source image.

3. A holographic projector as claimed in claim 1 wherein the image processing engine is arranged to dynamically change how the secondary images are derived from the source image based on a control signal.

4. A holographic projector as claimed in claim 1 wherein the refresh rate of the first hologram is different to the refresh rate of the second hologram, wherein refresh rate is the frequency at which a hologram is recalculated from the next source image in a sequence of source images received by the image processing engine.

5. A holographic projector as claimed in claim 1 wherein the display engine is further arranged to translate at least one of the holographic reconstructions in order to faithfully reconstruct the source image on the replay plane.

6. A holographic projector as claimed in claim 1 wherein the display engine is arranged to display each hologram by tiling each hologram onto the display device, wherein tiling comprises repeating at least a subset of contiguous pixels of the hologram on the display device in accordance with a tiling scheme.

7. A holographic projector as claimed in claim 6 wherein the display engine is arranged to use a first tiling scheme to tile the first hologram onto the display device and a second tiling scheme to tile the second hologram onto the display device.

8. A holographic projector as claimed in claim 6 wherein the display engine is arranged to dynamically change the tiling scheme based on a control signal.

9. A holographic projector as claimed in claim 1 wherein each secondary image corresponds to a different region of the source image area, optionally wherein the first secondary image corresponds to near-field image content and the second secondary image corresponds to far-field image content.

10. A holographic projector as claimed in claim 1 wherein each secondary image is generated by uniquely sampling the source image.

11. A holographic projector as claimed in claim 1 wherein the number of secondary images is greater than two.

12. A holographic projector as claimed in claim 1 wherein the image processing engine is arranged to transmit the first and second secondary images to the hologram engine in one frame of data.

13. A holographic projector as claimed in claim 1 wherein the image processing engine is arranged to receive a stream of source images at video rate, and
   wherein the display device is arranged to display each of the first and second holograms corresponding to each source image, so as to form a holographic reconstruction of each source image on the replay plane at the video rate.

14. A holographic projector as claimed in claim 13 wherein the display device is arranged to display each of the first and second holograms corresponding to each source image at a speed such that the holographic reconstructions thereof are formed within the integration time of the human eye.

15. A holographic projector as claimed in claim 1 wherein the display device is a pixel-based spatial light modulator (SLM).

16. A head-up display or a head-mounted display comprising a holographic projector as claimed in claim 1.

17. A method of holographic projection comprising:
   receiving a source image for projection, wherein the source image comprises pixels;
   generating first and second secondary images from the source image, wherein each secondary image comprises fewer pixels than the source image and wherein the first secondary image has more pixels than the second secondary image;
   calculating first and second holograms corresponding to the first and second secondary images, respectively, such that the first hologram has more pixels than the second hologram;
   displaying each hologram in turn on a display device; and
   Illuminating each of the first and second holograms during display to form a holographic reconstruction corresponding to the first and second secondary images, respectively, on a replay plane.

18. A method as claimed in claim 17 further comprising dynamically changing how the secondary images are derived from the source image based on a control signal.

19. A method as claimed in claim 17 wherein displaying each hologram in turn on the display device comprises tiling each hologram onto the display device in turn.

20. A method as claimed in claim 17 further comprising receiving a stream of source images and refreshing the first hologram at a different rate to the second hologram.

* * * * *